E. E. HUSTED.
PLANT CARRIER.
APPLICATION FILED NOV. 29, 1909.
955,164. Patented Apr. 19, 1910.
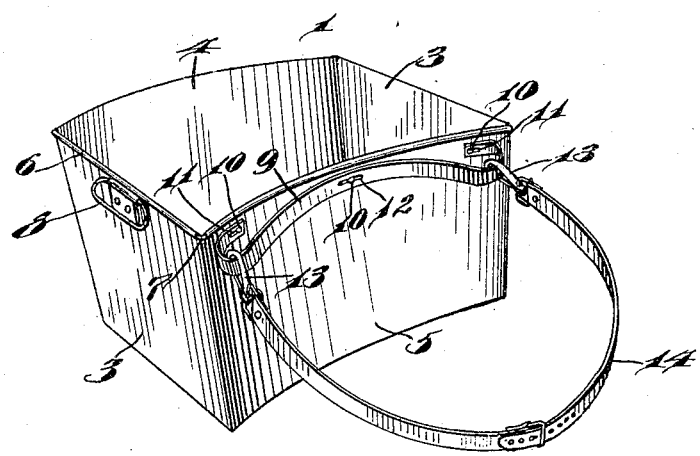
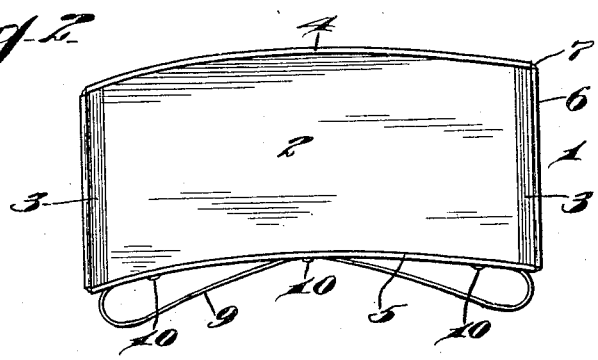
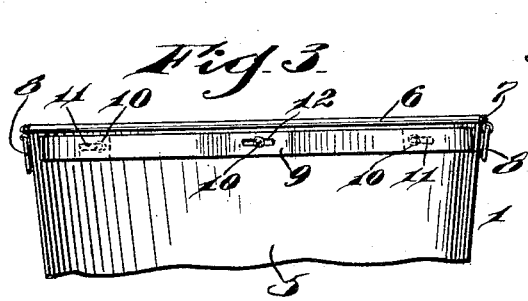
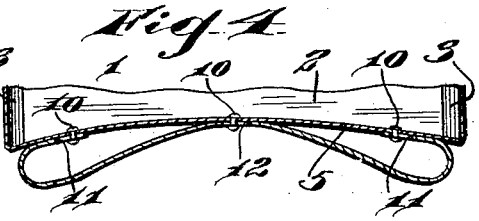
Witnesses
Inventor
Ellsworth E. Husted,
By
Joshua R. H. Potts
Attorney

UNITED STATES PATENT OFFICE.

ELLSWORTH E. HUSTED, OF NEWPORT, NEW JERSEY.

PLANT-CARRIER.

955,164.	Specification of Letters Patent.	Patented Apr. 19, 1910.

Application filed November 29, 1909. Serial No. 530,461.

*To all whom it may concern:*

Be it known that I, ELLSWORTH E. HUSTED, a citizen of the United States, residing at Newport, in the county of Cumberland and State of New Jersey, have invented certain new and useful Improvements in Plant-Carriers, of which the following is a specification.

My invention relates to improvements in plant carriers, the object of the invention being to provide a carrier which is especially adapted for carrying plants during the operation of transplanting, and which is so constructed as to be supported against the body, and conform to the shape of the body, so as to make it comfortable to the operator and which is of extremely simple, inexpensive construction, strong and durable in use.

With these and other objects in view the invention consists in certain novel features of construction and combinations and arrangements of parts, as will be more fully hereinafter described and pointed out in the claim.

In the accompanying drawings: Figure 1 is a perspective view illustrating my improvements. Fig. 2 is a top plan view. Fig. 3 is a fragmentary view in side elevation, and Fig. 4 is a view in longitudinal section.

1 represents the receptacle proper, which is preferably made of sheet metal, having a flat bottom 2, ends 3, and front and rear sides 4 and 5 respectively, said ends, and front and rear sides preferably tapering outward from their lower to their upper ends, the ends 3 being flat while the front and rear sides 4 and 5 are curved concentrically, and the bottom 2 is shaped to conform to the curvature of the front and rear sides.

The upper edge of the receptacle is properly strengthened by an overturned portion 6 around an inclosed wire 7, to form a strengthening bead around the upper edge of the receptacle, and suitable handles 8 are provided at the ends of the receptacle to facilitate the handling thereof when not strapped to the body. On the rear side 5, near the upper edge thereof, a flexible sheet spring 9 is secured by means of rivets 10 secured in the receptacle, and having headed ends projecting through slots 11 in the ends of spring 9 and through a slot 12 in the central portion of spring 9. It will be noted that the spring 9 is of general compound curvature, that is, both ends are bent back in circular form and secured by the rivets 10, while the intermediate portion curves inward against the side 5, and is secured by the central rivet 10. The curved end portions of the spring are adapted for the reception of snap hooks 13 on the ends of a strap 14, adapted to be fastened around the body of the user so as to hold the receptacle 1 in position, and when held by the strap, due to the flexibility and elasticity of spring 9, the latter will conform to the shape of the body of the wearer, and will not only enable the device to be more securely held, but will render it more comfortable for the user. Due to the slots 11, the spring is allowed longitudinal movement on the rivets 10, so as to conform to any shape of body.

Various slight changes might be made in the general form and arrangement of parts described without departing from my invention, and hence I do not restrict myself to the precise details set forth, but consider myself at liberty to make such changes and alterations as fairly fall within the spirit and scope of the appended claim.

Having thus described my invention what I claim as new and desire to secure by Letters Patent is:

In a plant carrier, the combination with a receptacle, of an elongated, flat, metal spring, having inwardly curved ends and an inwardly curved intermediate portion disposed against one face of said receptacle, said spring having longitudinal slots in its ends and in its intermediate portion, rivets secured in said receptacle and projecting through the slots in said spring, heads on the ends of said rivets against said spring, and a strap adapted to be secured about the body and connected to the curved end portions of said spring.

In testimony whereof I have signed my name to this specification in the presence of two subscribing witnesses.

ELLSWORTH E. HUSTED.

Witnesses:
　CHARLES E. POTTS,
　R. H. KRENKEL.